(12) United States Patent
Kassubek et al.

(10) Patent No.: US 7,448,283 B2
(45) Date of Patent: Nov. 11, 2008

(54) VIBRATION-TYPE MEASURING DEVICE AND METHOD FOR OPERATING SUCH A MEASURING DEVICE

(75) Inventors: Frank Kassubek, Rheinfelden (DE); Joerg Gebhardt, Mainz (DE); Rene Friedrichs, Rosdorf (DE); Guenter Petri, Sandhausen (DE); Lothar Deppe, Goettingen (DE); Steffen Keller, Constance (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/939,178

(22) Filed: Nov. 13, 2007

(65) Prior Publication Data

US 2008/0127745 A1    Jun. 5, 2008

(30) Foreign Application Priority Data

Nov. 16, 2006  (DE)  ......................... 10 2006 054 007
Oct. 12, 2007   (DE)  ......................... 10 2007 049 242

(51) Int. Cl.
*G01F 1/84* (2006.01)
(52) U.S. Cl. ................................. 73/861.355
(58) Field of Classification Search ............ 73/861.355, 73/861.356, 861.357
See application file for complete search history.

(56) References Cited

U.S. PATENT DOCUMENTS 4,187,721 A * 2/1980 Smith ................... 73/861.356
6,860,158 B2 * 3/2005 Bitto et al. ............. 73/861.355

FOREIGN PATENT DOCUMENTS

WO WO 2004/053428 (A2)    6/2004

* cited by examiner

*Primary Examiner*—Jewel Thompson
(74) *Attorney, Agent, or Firm*—Buchanan Ingersoll & Rooney PC

(57) ABSTRACT

The disclosure relates to a vibration-type measuring device for measuring at least one process variable, in particular a mass flow rate, a density, a viscosity, a pressure or the like, in particular in a process line through which a medium can flow, which device comprises at least one measurement sensor which provides a measurement signal that can be influenced by the process variable, the measured value determined for the process variable by the measuring device being able to be determined from a functional relationship in conjunction with measurement parameters from the measurement signal, and the measurement parameters having a temperature-dependent cross-sensitivity with respect to the temperature distribution in the measuring device. The measuring device comprises at least one temperature sensor, by means of which the local temperature can be measured, and a temperature distribution field can then be calculated with electronic means using a temperature distribution theorem, and correction values for compensating for the temperature-dependent cross-sensitivities of the measurement parameters can be determined from the temperature field data.

19 Claims, 1 Drawing Sheet

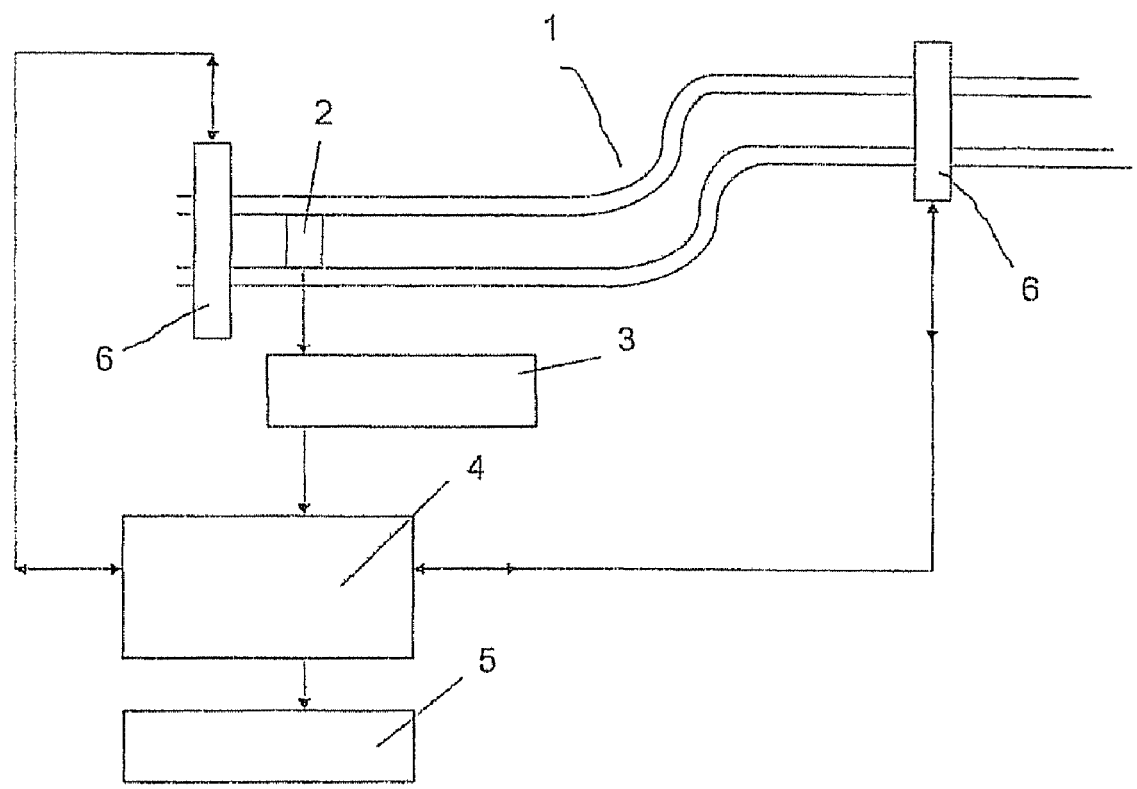
Figure

VIBRATION-TYPE MEASURING DEVICE AND METHOD FOR OPERATING SUCH A MEASURING DEVICE

RELATED APPLICATIONS

This application claims priority under 35 U.S.C. §119 to German Patent Application No. 0 2007 049 242.3 filed in the German Patent Office on 12 Oct. 2007, and to German Patent Application No. 10 2006 054 007.7 filed in the German Patent Office on 16 Nov. 2006, the entire contents of which are hereby incorporated by reference in their entireties.

TECHNICAL FIELD

A vibration-type measuring device is disclosed and a method for operating such a measuring device is disclosed.

BACKGROUND INFORMATION

Measuring devices of the generic type are known to be used to measure at least one process variable, in particular a mass flow rate, a density, a viscosity, a pressure or the like, in particular in a process line through which a medium can flow. They comprise at least one measurement sensor which provides a measurement signal that can be influenced by the process variable, the measured value determined for the process variable by the measuring device being able to be determined from a functional relationship in conjunction with measurement parameters from the measurement signal, and the measurement parameters having a temperature-dependent cross-sensitivity with respect to the temperature distribution in the measuring device. A Coriolis flowmeter which is known in principle is one specific example of a measuring device of the generic type.

The mass flow rate q and the mass density rho of a medium can be determined using a Coriolis flowmeter. In this case, (at least) one tube through which the medium flows is caused to oscillate in (at least) one Eigen mode at the Eigen frequency f and the temporal phase shift dt of the oscillation deflection is measured between two symmetrical points of the tube through which the flow passes. The mass flow rate q can then be calculated from the measurement signal of the phase shift dt using $$q = K(dt - d0)$$

and the density rho of the medium is obtained from the frequency f using $$rho = rho0 + W/(f^2).$$

The abovementioned functional relationships for determining the measured values of the density rho and the mass flow rate q comprise the measurement parameters d0 (zero point phase), rho0 (density offset), K (flowmeter constant), W (density variation parameter).

The zero point phase d0, the density offset rho0 and also, in particular, the so-called flowmeter constant K and the density variation parameter W are now, however, dependent on the generally different temperatures of the individual components and spatial segments of the measuring device.

This means that, for example on account of temperature-induced stresses or changes in the material properties, each individual one of these parameters is a functional of the spatial temperature distribution in the measuring device d0=F1[T(x,y,z)], rho0=F2[T(x,y,z)], K=F3[T(x,y,z)] and W=F4[T(x,y,z)].

The problem is thus the cross-sensitivity of the flow measurements and density measurements with respect to the spatial temperature distribution T(x,y,z) and, after suitable discretization, with respect to an appropriate set of temperature values [T1, T2, ..., Tn].

Although this cross-sensitivity can be calculated by measuring the temperatures T1, T2, ..., Tn and with knowledge of the functional dependence of the parameters d0=f(T1, T2, ..., Tn), rho0=f(T1, T2, ..., Tn) etc., it requires a correspondingly extensive temperature measurement.

WO 04053428 discloses a method and a device which takes into account temperature values which have been recorded in the past, that is to say records a type of temperature history.

However, this includes only one partial aspect, namely that of monitoring whether a temperature shift may result in measured values being influenced locally.

In this case, the operations of recording and deriving temperature dependencies are therefore only inadequate, and may therefore have a corrupting influence.

SUMMARY

Therefore, the disclosure is based on the object of developing a measuring device of the generic type and a method for operating such a measuring device such that cross-sensitivities can also be compensated for with respect to a temperature distribution in the measuring device. In particular, temperature-induced stresses or changes in the material properties throughout the entire device should be able to be taken into account, for example.

An exemplary measuring device thus comprises at least one temperature sensor, by means of which the local temperature can be measured, and a temperature distribution field can then be calculated with electronic means using a temperature distribution theorem, correction values for compensating for the temperature-dependent cross-sensitivities of the measurement parameters being able to be determined from the temperature field data.

According to the disclosure, in one exemplary embodiment in the form of a Coriolis flowmeter, a temperature sensor is placed at least one point in the Coriolis flow measurement tube or flowmeter, by means of which the local temperature can be measured, and a temperature distribution field can then be calculated with electronic means from a temperature distribution theorem which corresponds to the evaluation unit.

The temperature distribution field determined in this manner then determines, for example, purely temperature-induced local deflections or dilatations which are subtracted from the measured value, with the result that all that remains is the flow-induced measured value from which temperature disturbances have been removed.

According to another exemplary refinement, the temperature field determination unit is physically integrated in the evaluation unit.

In another exemplary refinement, the temperature distribution theorem comprises the analytical or numerical solution of the partial differential equations for the heat propagation in the measuring device, the volume thermal capacity c(x,y,z) and the thermal conductivity k(x,y,z) having a spatial dependence which corresponds to the measuring device.

In another exemplary refinement of the disclosure, the temperature distribution theorem comprises the analytical or numerical solution of the conventional differential equations which describe the heat propagation in the device, which is modeled using a thermal network.

In another exemplary refinement of the disclosure, the current temperature distribution field is determined from the temperature distribution theorem taking into account previous measured temperature values and/or previous calculated temperature distributions.

An aspect of an exemplary method for operating a vibration-type measuring device, e.g., a Coriolis flowmeter, is that a temperature sensor is placed at least one point in the measurement tube or measuring device, by means of which the local temperature is measured, and a temperature distribution field is then calculated from a temperature distribution theorem, and that correction data for compensating for temperature-dependent cross-sensitivities are determined from the temperature field data.

BRIEF DESCRIPTION OF THE DRAWING

The sole FIG. 1 schematically shows the interaction of the components of an inventive device.

DETAILED DESCRIPTION

One exemplary embodiment of a disclosed method is characterized by the fact that the temperature distribution theorem comprises the analytical or numerical solution of the partial differential equations for the heat propagation in the measuring device, the volume thermal capacity $c(x,y,z)$ and the thermal conductivity $k(x,y,z)$ having a spatial dependence which corresponds to the measuring device.

Another exemplary embodiment of a disclosed method is characterized by the fact that the following formal relationship is used to determine the temperature distribution field by electronic calculation of an analytical or numerical solution of the partial differential equations for the heat propagation in the device by using the thermal conduction equation to be solved for the temperature distribution $T(x,y,z;t)$ as a basis for $$c\frac{\partial}{\partial t}T = \frac{\partial}{\partial x}k\frac{\partial}{\partial x}T + \frac{\partial}{\partial y}k\frac{\partial}{\partial y}T + \frac{\partial}{\partial z}k\frac{\partial}{\partial z}T,$$

the volume thermal capacity $c(x,y,z)$ and the thermal conductivity $k(x,y,z)$ then having a spatial dependence which corresponds to the device.

Another exemplary embodiment of a disclosed method is characterized by the fact that the temperature distribution is effected under the boundary conditions that $T(x^2+y^2=r, 0<z<l)=T_M(t)$. That is to say, the tube with the radius r and the length l is at the time-dependent temperature of the medium everywhere.

Another exemplary embodiment of a disclosed method is characterized by the fact that the temperature distribution theorem comprises the analytical or numerical solution of the conventional differential equations which describe the heat propagation in the device, which is modeled using a thermal network.

Another exemplary embodiment of a disclosed method is characterized by the fact that previous measured temperature values and/or previous calculated temperature distributions are also concomitantly taken into account in addition to the temperature measurement and the temperature field distribution. Convection, thermal conduction etc. can be determined by means of time correlation. As a result, the temperature distribution field is described in full.

Another exemplary embodiment of a disclosed method is characterized by the fact that the temperature field data are used to determine correction data which are used to carry out an amplitude correction in such a manner that only the relevant amplitude values from which temperature effects have been removed are used to determine the flow rate.

Corresponding electronic computation means are also provided in an inventive measuring device in order to carry out an inventive method.

In an exemplary measuring device, temperature measurements and/or heat flow measurements are therefore carried out at only a few points (at only one point in the extreme case) in the device or in the medium or in the area surrounding the device.

The knowledge of these measured values at a time t_m and the knowledge (or a suitable assumption) of the spatial temperature distribution $T(x,y,z)$ or of a set [T1, T2, . . . , Tn] of temperatures prevailing in various segments of the device at the time t_m are used to calculate the spatial temperature distribution $T(x,y,z)$ or the set [T1, T2, . . . , Tn] of temperatures prevailing in various segments of the device at a time t_m+1 using a suitable mathematical model.

If required, the mathematical model can likewise also be used to calculate the thermal energy densities [w1, w2, . . . wn] or heat flows [J1, J2, . . . , Jn] at any desired positions in the device.

It is thus possible to calculate the cross-sensitivity of any parameter P in the flow or density calculation (for example K or rho0) not only with respect to measured temperatures or heat flows but also with respect to additional calculated temperature values, thermal energy densities or else heat flows.

The mathematical model and the associated algorithm are characterized by the fact that they use the measured values [TM1, . . . , TMi, JM1, . . . , JMi](t_m) and the values [T1, . . . , Tn, w1, . . . wn, J2, . . . , Jn](t_m) to calculate the values [T1, . . . , Tn, w1, . . . wn, J2, . . . , Jn](t_m+1).

The mathematical model and the algorithm may, for example, comprise:

1. the analytical or numerical solution of the partial differential equations which describe the heat propagation in the device resulting, for example, from thermal conduction, convection or radiation transport. The thermal conduction equation to be solved for the temperature distribution $T(x,y,z;t)$ in the device would be, for example, $$c\frac{\partial}{\partial t}T = \frac{\partial}{\partial x}k\frac{\partial}{\partial x}T + \frac{\partial}{\partial y}k\frac{\partial}{\partial y}T + \frac{\partial}{\partial z}k\frac{\partial}{\partial z}T,$$

in which case the volume thermal capacity $c(x,y,z)$ and the thermal conductivity $k(x,y,z)$ would then have a spatial dependence corresponding to the device. By way of example, one boundary condition for the temperature distribution could then be $T(x^2+y^2=r, 0<z<l)=T_M(t)$. That is to say, the tube with the radius r and the length l is at the time-dependent temperature of the medium $T_M(t)$ everywhere;

2. the analytical or numerical solution of the conventional differential equations which describe the heat propagation in the device, which is modeled using a thermal network;

3. a calculation rule (that is to say a function) B{ . . . } obtained in any way (empirically, by means of a physical model, by means of a neural network, statistically, . . . ) in which

[T1, . . . , Tn, w1, . . . wn, J2, . . . , Jn](t_m+1)=
B{[T1, . . . , Tn, w1, . . . wn, J2, . . . , Jn](t_m);
[TM1, . . . , TMi, JM1, . . . , JMi](t_m)}.

Finally, the cross-sensitivities relating to a suitable subset of the measured and calculated temperatures, heat flows etc.

{[TM1, ..., TMi, JM1, ..., JMi](t); [T1, ..., Tn, w1, ... wn, J2, ..., Jn](t)} at the time t can then be taken into account when calculating the mass flow rate and mass density, respectively, at a time t.

EXAMPLES

1) Flowmeter constant K=f_K(TM, TM2, JM7, T1, T2, w8) and f_K( ... ) is a suitable mathematical function.
2) Mass flow rate Q=f_Q(dt, TM1, TM2, T1) and f_Q( ... ) is a suitable mathematical function of the measured phase shift dt and the measured and/or calculated temperatures.

The disclosure will be described in more detail below with reference to one exemplary embodiment.

A temperature sensor 2 is arranged in the area of the measurement tube 1.

The value measured there is read into electronic means 3 which are referred to here as a temperature field determination unit. A temperature field, that is to say the distribution of the temperature along the entire measurement tube, is calculated in said unit from the temperature value measured at only one point, based on the stated theorem.

These determined distribution data are then included in the evaluation inside the evaluation unit 4.

The measurement signals from the measurement sensors 6 are also recorded and processed in the evaluation unit 4. The measurement sensors 6 are, for example, electrodynamically operating displacement sensors which record the vibrations of the measurement tube 1 at the inlet and outlet. The phase shift dt of the measurement signals is determined in the evaluation unit 4 and is then used to determine the mass flow rate q taking into account the flowmeter constant K and the zero point phase d0.

The cross-sensitivity of said parameters of the flowmeter constant K and the zero point phase d0 is corrected in the manner described above in the evaluation unit 4 on the basis of the temperature distribution values determined.

The flow value, which has been corrected for temperature in this way, is then represented on the display 5.

In this case, one embodiment may comprise modeling as a thermal network, comprising the three components tube, end plate and frame with the respective temperatures $T_{Tube}$, $T_{Plate}$ and $T_{Housing}$: only the temperatures $T_T$ and $T_H$ are measured, while the temperature of the end plate $T_P$ is calculated.

For this purpose, it is assumed that the flow $J_1$ of thermal energy from the tube into the end plate is proportional to the temperature difference $$J_1 = (T_T - T_P)/R_1$$

and, in a corresponding manner, the flow $J_2$ of thermal energy from the end plate into the housing is proportional to the temperature difference $$J_2 = (T_P - T_H)/R_2.$$

Since the temperature of the end plate $T_P$ is proportional to the thermal energy stored in the plate $$T_P = W_P/C$$

and its rate of change $$(\dot{x} := dx/dt)$$

is once again provided by the sum of the heat inlet flows and outlet flows $$\dot{W}_P = J_1 - J_2,$$

this finally results in the differential equation $$\dot{T}_P = -T_P/\tau + T_T/CR_1 + T_H/CR_2$$

for the temperature of the plate, with the characteristic time $$\tau = C/(1/R_1 + 1/R_2).$$

The temperature $T_P(t)$ can be calculated from the measured temperature values $T_T(t)$ and $T_H(t)$ using the above differential equation if the values (for example determined experimentally) of the constants $R_1$, $R_2$ and $C$ are known.

For this purpose, it is assumed that the temperature $T_P(0)$ at any initial time t=0 is equal to the temperature in the steady-state solution $$T_P(0) = \tau(T_T(0)/CR_1 + T_H(0)/CR_2)$$

and the respective subsequent temperature value for the plate at the time $t_+ = t + \Delta t$ is then always calculated in advance using the calculation rule $$T_P(t + \Delta t) = T_P(t) - [T_P(t)/\tau + T_T(t)/CR_1 + T_H(t)/CR_2]\Delta t.$$

Finally, the flowmeter constant at any given time t is determined, using the temperatures $T_T(t)$, $T_P(t)$ and $T_H(t)$ that are therefore known, to be $$K(t) = K_0 + K_T T_T(t) + K_P T_P(t) + K_H T_H(t),$$

where the constants $K_0$, $K_T$, $K_P$, $K_H$ have been determined experimentally, and only the temperatures $T_T(t)$ and $T_H(t)$ are measured during operation of the flowmeter.

In this case, it should additionally be noted that the proposed solution for "temperature calculation instead of temperature measurement" and subsequent compensation for the temperature distribution and for a plurality of spatially distributed temperature values can in principle be extended to any desired measuring devices.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A vibration-type measuring device for measuring at least one process variable, in particular a mass flow rate, a density, a viscosity, a pressure or the like, in particular in a process line through which a medium can flow, which device comprises at least one measurement sensor which provides a measurement signal that can be influenced by the process variable, the measured value determined for the process variable by the measuring device being able to be determined from a functional relationship in conjunction with measurement parameters from the measurement signal, and the measurement parameters having a temperature-dependent cross-sensitivity with respect to the temperature distribution in the measuring device, the measuring device comprising at least one temperature sensor, by means of which the local temperature can be measured, and a temperature distribution field can then be calculated with electronic means using a temperature distribution theorem, and wherein correction values for compensating for the temperature-dependent cross-sensitivities of the measurement parameters can be determined from the temperature field data.

2. The measuring device as claimed in claim 1, which is a Coriolis flowmeter having at least one flow measurement tube and an evaluation unit, wherein a temperature sensor is placed at least one point in the Coriolis flow measurement tube or flowmeter, by means of which the local temperature can be measured, and a temperature distribution field can then be calculated with electronic means from a temperature distribution theorem which corresponds to the evaluation unit.

3. The measuring device as claimed in claim 1, wherein the temperature field determination unit is physically integrated in the evaluation unit.

4. The measuring device as claimed in claim 1, wherein the temperature distribution theorem comprises the analytical or numerical solution of the partial differential equations for the heat propagation in the measuring device, the volume thermal capacity $c(x,y,z)$ and the thermal conductivity $k(x,y,z)$ having a spatial dependence which corresponds to the measuring device.

5. The measuring device as claimed in claim 1, wherein the temperature distribution theorem comprises the analytical or numerical solution of the conventional differential equations which describe the heat propagation in the device, which is modeled using a thermal network.

6. The measuring device as claimed in claim 1, wherein the current temperature distribution field is determined from the temperature distribution theorem taking into account previous measured temperature values and/or previous calculated temperature distributions.

7. A method for operating a vibration-type measuring device, in particular a Coriolis flowmeter, wherein a temperature sensor is placed at least one point in the measurement tube or measuring device, by means of which the local temperature is measured, and a temperature distribution field is then calculated by an electronic computation means from a temperature distribution theorem, and wherein correction data for compensating for temperature-dependent cross-sensitivities are determined from the temperature field data.

8. The method as claimed in claim 7, wherein the temperature distribution theorem comprises the analytical or numerical solution of the partial differential equations for the heat propagation in the measuring device, the volume thermal capacity $c(x,y,z)$ and the thermal conductivity $k(x,y,z)$ having a spatial dependence which corresponds to the measuring device.

9. The method as claimed in claim 8, wherein the following formal relationship is used to determine the temperature distribution field by electronic calculation of an analytical or numerical solution of the partial differential equations for the heat propagation in the device by using the thermal conduction equation to be solved for the temperature distribution $T(x,y,z;t)$ as a basis for $$c\frac{\partial}{\partial t}T = \frac{\partial}{\partial x}k\frac{\partial}{\partial x}T + \frac{\partial}{\partial y}k\frac{\partial}{\partial y}T + \frac{\partial}{\partial z}k\frac{\partial}{\partial z}T,$$

the volume thermal capacity $c(x,y,z)$ and the thermal conductivity $k(x,y,z)$ then having a spatial dependence which corresponds to the device.

10. The method as claimed in claim 9, wherein the temperature distribution is effected under the boundary conditions that $T(x^2+y^2=r, 0<z<l)=T_M(t)$, and wherein the tube with the radius r and the length l is at the time-dependent temperature of the medium everywhere.

11. The method as claimed in claim 7, wherein the temperature distribution theorem comprises the analytical or numerical solution of the conventional differential equations which describe the heat propagation in the device, which is modeled using a thermal network.

12. The method as claimed in claim 7, wherein previous measured temperature values and/or previous calculated temperature distributions are also concomitantly taken into account in addition to the temperature measurement and the temperature field distribution.

13. The method as claimed in claim 7, wherein the temperature field data are used to determine correction data which are used to carry out an amplitude correction in such a manner that only the relevant amplitude values from which temperature effects have been removed are used to determine the flow rate.

14. The measuring device as claimed in claim 2, wherein the temperature field determination unit is physically integrated in the evaluation unit.

15. The measuring device as claimed in claim 3, wherein the temperature distribution theorem comprises the analytical or numerical solution of the partial differential equations for the heat propagation in the measuring device, the volume thermal capacity $c(x,y,z)$ and the thermal conductivity $k(x,y,z)$ having a spatial dependence which corresponds to the measuring device.

16. The measuring device as claimed in claim 3, wherein the temperature distribution theorem comprises the analytical or numerical solution of the conventional differential equations which describe the heat propagation in the device, which is modeled using a thermal network.

17. The measuring device as claimed in claim 5, wherein the current temperature distribution field is determined from the temperature distribution theorem taking into account previous measured temperature values and/or previous calculated temperature distributions.

18. The method as claimed in claim 11, wherein previous measured temperature values and/or previous calculated temperature distributions are also concomitantly taken into account in addition to the temperature measurement and the temperature field distribution.

19. The method as claimed in claim 12, wherein the temperature field data are used to determine correction data which are used to carry out an amplitude correction in such a manner that only the relevant amplitude values from which temperature effects have been removed are used to determine the flow rate.

* * * * *